United States Patent [19]
Haught

[11] 3,852,907
[45] Dec. 10, 1974

[54] FISHING SINKER
[76] Inventor: Stephen E. Haught, 4919 N. 62nd St., Omaha, Nebr. 68104
[22] Filed: Oct. 1, 1973
[21] Appl. No.: 402,109

[52] U.S. Cl. ............... 43/44.9, 43/43.14, 43/44.89
[51] Int. Cl. ............................................. A01k 95/00
[58] Field of Search ............... 43/44.9, 43.14, 44.89, 43/44.91, 43.1

[56] References Cited
UNITED STATES PATENTS
| | | | |
|---|---|---|---|
| 1,023,676 | 4/1912 | Pancoast | 43/43.14 |
| 2,275,076 | 3/1942 | Haynes | 43/44.9 |
| 3,192,662 | 7/1965 | Hoyle | 43/44.91 |
| 3,638,347 | 2/1972 | Kochevar | 43/43.14 X |

FOREIGN PATENTS OR APPLICATIONS
764,398  12/1956  Great Britain .................... 43/43.1

Primary Examiner—Louis G. Mancene
Assistant Examiner—Daniel J. Leach
Attorney, Agent, or Firm—Hiram A. Sturges

[57]    ABSTRACT

A sinker for use in fishing comprising wolframite material and means for securing the wolframite material to a fishing line comprising an elongated jacket having an opening therethrough for receiving a fishing line, the jacket having a filling aperture for insertion of wolframite particles.

7 Claims, 11 Drawing Figures

PATENTED DEC 10 1974 3,852,907
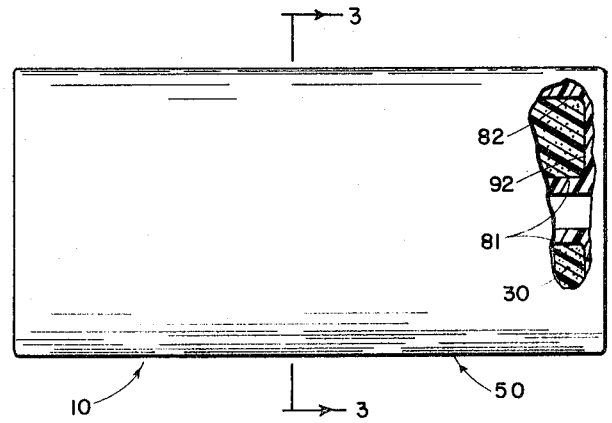
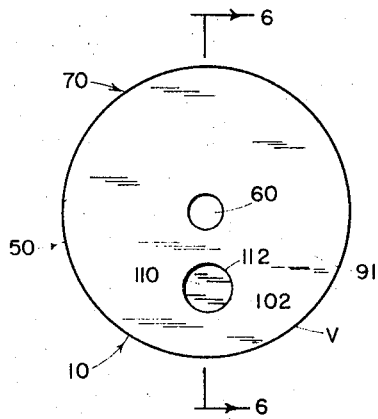
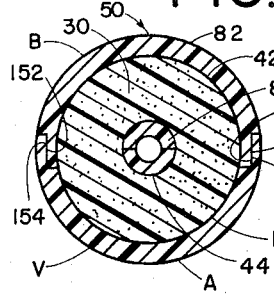
FIG. 3
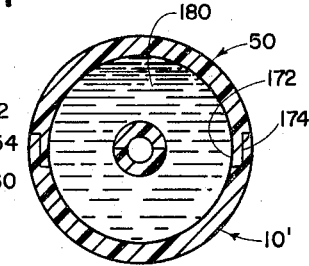
FIG. 4
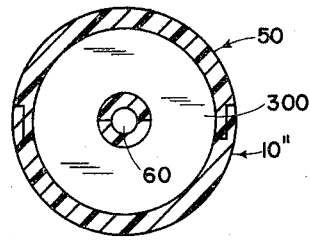
FIG. 5
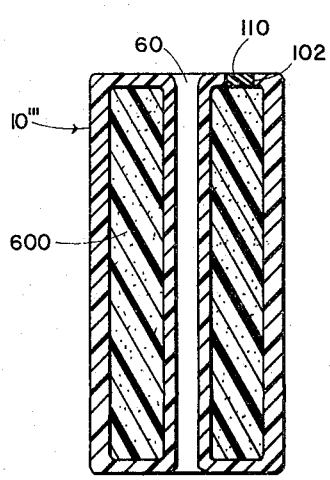
FIG. 6
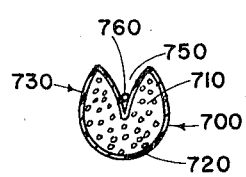
FIG. 7
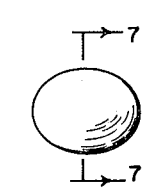
FIG. 8
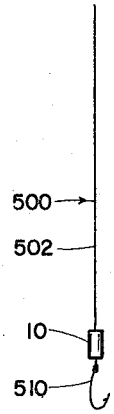
FIG. 9
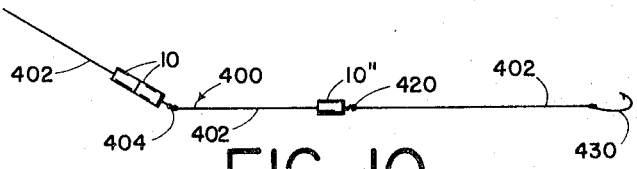
FIG. 10
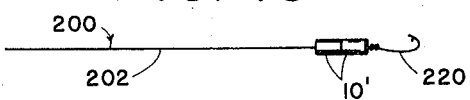
FIG. 11

FISHING SINKER

FIELD OF THE INVENTION

This invention is in the field of sinkers used in fishing and sometimes called weights for causing a line to sink in the water.

DESCRIPTION OF THE PRIOR ART

In the prior art, weights have been customarily made of lead. However, I have perceived that if a weight could be made of a material that was heavier than lead, then it would not need to be so bulky, and it would not catch weeds as often, nor would it snag as often on branches.

In addition to these factors, a weight that is narrower in proportion to its length is better for trolling because it does not present as wide an end surface to the water, which latter can cause the line not to sink as well.

In the prior art, wolframite as a material for weights have been overlooked. Wolframite is an ore from which tungsten is obtained and is useful in the hardening of steel. Tungsten is also used in light bulb filaments. But, tungsten has a cost of approximately 10 cents an ounce at a time when wolframite has a cost of approximately $42 for an entire ton.

Wolframite is mined as a rock and then crushed into particles which can be as finely crushed as powder.

SUMMARY OF THE INVENTION

A fishing sinker is disclosed comprising wolframite material and means for securing the wolframite material to a fishing line, the sinker having a weight of less than 7 ounces.

The sinker described is one in which the wolframite is in particle form and in which the securing means comprises malleable means such as lead mixed with the wolframite particles for surrounding the wolframite particles so as to hold them together and form with the particles of wolframite body, the body having a recess in it for receiving a fishing line against which the malleable body can be pressed for securing the weight to a fishing line.

The sinker described has means for securing wolframite material to a fishing line in which a jacket means defines at least a part of the securing means and the jacket means surrounds the wolframite material and has an opening therethrough for facilitating attachment to a fishing line, the jacket having an opening therethrough for facilitating placement of wolframite material in its interior during manufacture and which is later closed.

The jacket has first and second portions having opposed adjacent edges attached together and interfitting projection and recess means for ease of assembly during manufacture.

The fishing assembly comprises a hook means, a line means attached to the hook means, and a sinker which is elongated to the extent of having a length greater than its width in the ratio of greater than three to two, the sinker having a line opening extending lengthwise therethrough for receiving a line means.

BRIEF DESCRIPTION OF THE DRAWINGS

FIG. 1 is an end view of a preferred form of the sinker of this invention.

FIG. 2 is a side elevation of the sinker of this invention with a portion of the side thereof broken away for showing the interior in section.

FIG. 3 is a sectional view taken along the line 3—3 of FIG. 2, and showing a sinker filled with a solid material formed of wolframite particles bonded together with a cementing material.

FIG. 4 is a sectional view similar to FIG. 3, but showing the interior of the jacket of the sinker filled with water.

FIG. 5 is a sectional view similar to FIG. 3, but showing the interior of the jacket filled with air so that the same jacket functions as a float.

FIG. 6 is a sectional view taken along the line 6—6 of FIG. 1.

FIG. 7 is a view of a sinker of modified form shown in cross-section as taken along the line 7—7 of FIG. 8.

FIG. 8 is a side elevation of the modified sinker of FIG. 7.

FIG. 9 is a view showing a fish hook and line with the sinker of FIG. 1 mounted thereon, the line being in vertical position.

FIG. 10 is a view showing a fishing assembly used for trolling in which two of the sinkers are used for sinking one section of a line while an end portion is being held in horizontal position by one of the floats of FIG. 5.

FIG. 11 is a view showing a fishing assembly in trolling position in which the line is substantially horizontal because of the use of two sinkers of the FIG. 4 type.

DESCRIPTION OF THE PREFERRED EMBODIMENTS

In FIGS. 1 and 2, a preferred embodiment of the sinker of this invention is there shown at 10, and in FIG. 3, it can be seen that it has a central core 30 formed of particles of wolframite material which are bonded together by a cementing means such as waterproof epoxy cement.

The sinker 10 can have a weight similar to the most commonly used sinkers, such as ½ ounce, 1 ounce, or 1½ ounces, or it can have a weight of a larger range such as used in extremely deep fishing, such as 4 to 6 ounces, and in any case, would have a weight of less than 7 ounces.

The numeral 30 can be considered in FIG. 3 to represent a weight body formed of wolframite particles and the epoxy cement binder.

The weight body 30 in FIG. 3 is of a shape which is annular and elongated having a cylindrical outer surface 42 and a cylindrical inner surface 44, the weight body 30 being surrounded by a jacket means or a jacket assembly generally indicated at 50 and the jacket assembly 50 has an opening 60 therethrough which can be called a line opening since it is adapted to receive a fishing line and facilitates attachment of the sinker 10 to a fishing line. The jacket assembly 50 and, in a sense, also the epoxy cement, together form parts of a securing means which is given the numeral 70 which secures the wolframite material to a fishing line.

The jacket assembly 50 has inner and outer spaced side walls 81 and 82, both of which are cylindrical in shape whereby each is of annular shape and concentric with one another, and the jacket further has end walls 91 and 92 connected to the sidewalls 81 and 82.

As best seen in FIG. 3, the jacket 50 comprises first and second portions A and B, which latter together form a vessel designated by the letter V, which latter almost completely closes the hollow interior space 101 in the jacket, except for a very minor area represented by a filling aperture 102, best seen in FIG. 1, and which preferably extends through one of the end walls 91, 92.

The filling aperture 102 provides the advantage that after the jacket 50 is made from parts A and B which are made of a thermoplastic material for economy, then the interior of the jacket can be filled with particles of wolframite in powdered form and bonded by nothing at all by pouring the wolframite powder or particles through the opening 102. Or else, the powdered wolframite can be mixed with a liquid epoxy material, and then the two together are poured through the opening 102 until the interior of the jacket is filled, and after that the epoxy will harden and a portion of the epoxy will have the effect of sealing the opening 102 and will, in effect, form a plug which can be seen at 110 in FIG. 1.

Conversely, when it is powdered wolframite that is being put in without the epoxy cement, then the opening 102 can be closed by a special plug 110 formed of plastic or other material coated with cement so that when it is put in place, and the cement allowed to dry, it will hold the powdered wolframite in place. The numeral 112 is placed on FIG. 1 to indicate the position of the plug cement.

As best seen in FIGS. 3, 4 and also cured 5, the first and second jacket portions A and B have opposed adjacent edges 152 and 154 which are held together by a suitable plastic cement 160, and one of the edges 152 has a projection means 172 on it which is snugly received in a recess means 174 on the opposite adjacent edge, as best seen in FIG. 4, for ease of positioning the adjacent edges 152 and 154 opposite each other during manufacturing assembly.

Referring to FIG. 4, the weight or sinker thereshown has the same jacket 50, but is given a general numeral 10' because it differs from the weight of FIG. 3 in that its central space is filled with water 180 because there are times in the use of a weight, such as in casting, that it is desirable to have a weight that is much heavier than air so as to carry the end of the line outward and yet have the weight of no substantially different specific gravity than water itself so that the hook means used in casting does not sink excessively after the casting has been completed.

For example, referring to FIG. 11, a fishing assembly is there generally indicated at 200 and has a fishing line 202 on which are disposed two of the weights 10' and a hook means or hook 220, which latter term is intended to include any kind of a hooking device such as used in fishing.

In FIG. 11, the line 202 is horizontal, indicating that it is traveling outward after casting, although it could be a view at a time when the line is flying through the air.

Referring now to FIG. 5, a modification of the weight is there shown at 10'' which has a jacket generally indicated at 50 because it is exactly the same jacket as in FIG. 3, but in which the space 300 of its hollow interior is filled with air, whereby the fishing unit of FIG. 5 is a float 10'', but it is adapted to be carried on a line by passing the line through the float at its central opening 60.

An example of the use of the float 10'' is in FIG. 10 in which a fishing assembly 400 is there shown comprising a line 402 having a clamp 404 thereon with two weights or sinkers 10 of the type shown in FIG. 3 on the inner end of the clamp 404 and a float 10'' of FIG. 5 disposed on the line 402 outwardly from the clamp 404 and between it and another clamp 420 which is spaced along the line 402 from a hook means 430, whereby the weights 10 carry the line downward at a slant and the float 10'' carries the lower end of the line in a horizontal position when the line is used for trolling.

In ordinary still-fishing, a fishing assembly 500 is used as seen in FIG. 9, comprising a line 502 having a weight sinker 10 on it and having a hook means 510, the line 502 being vertical.

Referring to FIG. 6, this view is used to show a section along the line 6—6 of FIG. 1, but is used also for the double purpose of showing a sinker exactly like the sinker 10 of FIGS. 1 and 3, but given the numeral 10''' because its interior material comprises wolframite particles 600 which are simply in powdered form and not bonded together by anything.

The modified sinker of FIG. 7 is generally indicated at 700 and comprises wolframite particles 710 surrounded by a special outer jacket 720 made of some malleable material such as lead, whereby the particles 710 and the jacket 720 together form a weight body given the numeral 730, which latter has a recess 750 therein for receiving a fishing line 760, whereby the total malleable nature of the body 730 permits portions of the body to be pressed together to reduce the size of the recess 750 and to grip the fishing line 760 as a method of attachment.

The sinkers 10, 10', 10''', 700, and the float 10'', can all be as small as one-thirty second of an inch in diameter and still have some practicality because of the great density of the sinkers, whereby their small diameters would cause them to catch weeds and rocks more infrequently.

The length of the jacket 50 is preferably twice as long as its outer diameter, but is at least longer than its outer diameter by the ratio three to two.

It is much better that more weights of a smaller diameter be used to gain a total weight than a single sinker of a larger diameter which would catch weeds.

The particular outer shell material preferred is plastic of the type called "P.V.C.," polyvinylchloride.

The wolframite is approximately 50 percent heavier by volume than lead which results in a 50 percent reduction in size for the same accomplishment and the annular cylindrical design of much greater length than width makes a weight of less water resistance and less likelihood of snagging on weeds. The wolframite and epoxy center can be used without the jacket as a sinker, also.

I claim:

1. A fishing sinker comprising wolframite material, and means for securing said wolframite material to a fishing line, said sinker having a weight of less than 7 ounces, and further comprising: a jacket means surrounding said wolframite material and said jacket means having an opening therethrough for facilitating attachment to a fishing line, said jacket means defining at least a part of said securing means.

2. The sinker of claim 1 in which said wolframite material is in particle form and in which said securing means comprises malleable means securing said wolframite particles together and forming with said particles a weight body, said body having a recess therein for receiving a fishing line whereby said malleable means permits portions of said body to be pressed toward each other at said recess to grip said fishing line.

3. The weight of claim 1 further comprising: said jacket having inner and outer spaced sidewalls each of annular shape and having end walls connected to said sidewalls, said jacket having first and second portions forming a vessel which almost completely encloses an interior space except for a very minor area having a filling aperture therethrough through which filling material can be poured during manufacture.

4. The weight of claim 3 further comprising: said jacket having a third wall portion secured to said vessel and closing said filling aperture.

5. The weight of claim 3 further comprising: said first and second jacket portions having opposed adjacent edges attached together, said adjacent edges having projection means on one adjacent edge and recess means on the opposite adjacent edge, said recess means receiving said porjection means for ease of positioning of said adjacent edges during manufacture, and means securing said adjacent edges together.

6. The sinker of claim 1 in which said wolframite is in particle form held together by a binder material.

7. The sinker of claim 1 in which the exterior of said sinker is greater in length than width by more than the ratio of three to two so as to reduce tendency to catch on weeds and rocks.

* * * * *